United States Patent [19]
Deckert

[11] 3,738,407
[45] June 12, 1973

[54] ROLLER FOR MOUNTING ON THE TIRES OF A TRACTOR

[76] Inventor: Dale I. Deckert, 1295 Pleasant St., Noblesville, Ind. 46060

[22] Filed: Apr. 30, 1971

[21] Appl. No.: 138,909

[52] U.S. Cl. .............................. 152/175, 152/225
[51] Int. Cl. ............................................ B60c 27/00
[58] Field of Search ............................ 152/175, 225

[56] References Cited
UNITED STATES PATENTS

| | | | |
|---|---|---|---|
| 1,257,763 | 2/1918 | Tamaki | 152/175 |
| 2,318,918 | 5/1943 | Austin | 152/225 |
| 3,107,128 | 10/1963 | Ruane | 152/175 |

Primary Examiner—James B. Marbert
Attorney—Woodard, Weikart, Emhardt & Naughton

[57] ABSTRACT

A belt roller fittable onto a tractor tire for rolling of the ground. A continuous sheet extends around the tire and is in contact with the tire tread. A plurality of brackets are mounted interiorly to the sheet and project radially inward so as to grip both the tread surface and side wall of the tire to prevent relative motion between the tire and sheet.

5 Claims, 5 Drawing Figures

PATENTED JUN 12 1973 3,738,407

INVENTOR
DALE I. DECKERT
BY
Woodard, Weikart, Emhardt & Naughton
ATTORNEYS 3,738,407

ROLLER FOR MOUNTING ON THE TIRES OF A TRACTOR

BACKGROUND OF THE INVENTION

1. Field of the Invention

This invention is in the field of rolling attachments for vehicles.

2. Description of the Prior Art

In order to achieve a smooth flat lawn or field it may be necessary to roll the lawn or field with a fairly heavy roller. These rollers may be either manually moved or coupled to a vehicle for pushing or pulling the roller across the lawn or field. Two such rollers connectable to a vehicle are disclosed in the U.S. Pat. No. 2,315,397 issued to Butler and U.S. Pat. No. 2,664,683 issued to DeCato. The DeCato device is a fairly large structure which has a frame as well as rollers. The Butler device is a hollow cylinder which may be positioned on a pair of adjacent pneumatic tires.

The prior art devices are relatively expensive and require considerable time and effort in mounting the device to the wheel. It is desirable to provide a very low-cost roller having a minimum number of parts and which may be quickly and easily mounted to a single tire. The device disclosed herein provides such a roller.

SUMMARY OF THE INVENTION

One embodiment of the present invention is a combination of a tire having side walls and a tread; a continuous sheet extending around the tire and in contact with the tread; and brackets mounted interiorly to the sheet and in gripping engagement with the side walls preventing relative motion between the tire and the sheet.

It is an object of the present invention to provide a new and improved means for ground rolling.

It is an additional object of the present invention to provide a very inexpensive roller which may be mountable to a tire for rolling the ground.

It is a further object of the present invention to provide a ground roller having a minimum number of parts and which may be quickly and easily mounted to a single tire.

Related objects and advantages of the present invention will be apparent from the following description.

DESCRIPTION OF THE PREFERRED EMBODIMENT

Figure 1:
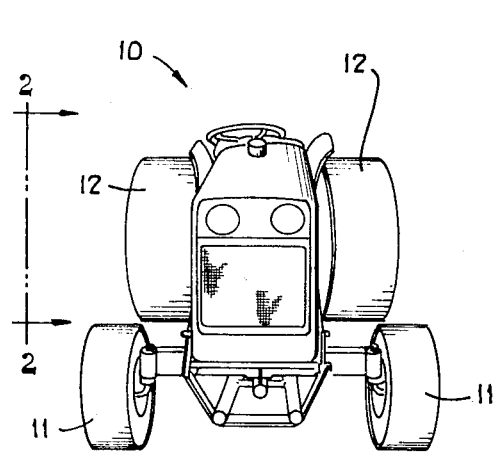
FIG. 1 is a front perspective view of a tractor having the rollers disclosed herein.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
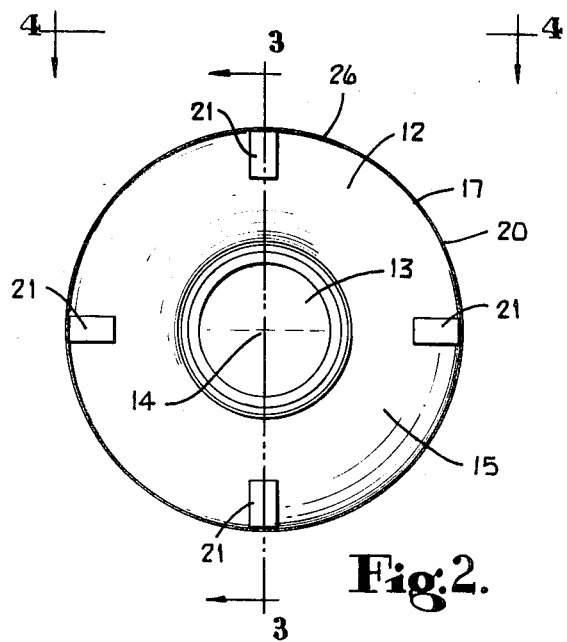
FIG. 2 is an enlarged side view looking in the direction of arrows 2—2 of one of the tires and rollers of FIG. 1.
Figure 3:
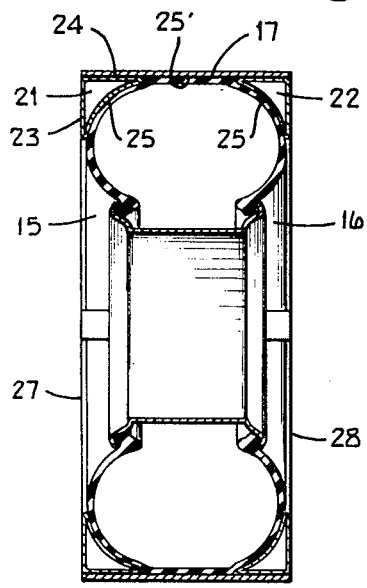
FIG. 3 is a cross-sectional view taken along the line 3—3 of FIG. 2 and viewed in the direction of the arrows.

Referring now more particularly to FIG. 1, there is illustrated a tractor 10 having a pair of front wheels 11 and a pair of back wheels 12. Mounted to each wheel are continuous sheets which extend around each tire so as to contact the tread of the tire. FIG. 2 is a side view of one of the wheels of FIG. 1 showing tire 12 mounted on a hub 13 with an axis of rotation shown at location 14. Tire 12 has a side wall 15 and a side wall 16 (FIG. 3) with a tread surface 17 disposed therebetween. A continuous sheet 20 is in contact with tread 17 and is held securely to the tire by a plurality of identical brackets 21 and 22 positioned on either side of the sheet. Each bracket has a pair of sides 23 and 24 positioned at right angles with a third side 25 being positioned opposite of the right angle and being concave so as to be complementary to the shape of the tire edge. Sides 24 of brackets 21 and 22 are mounted to the interior surface 25 of sheet 20. The brackets may be integral with sheet 20 or may be secured thereto by standard fastening means such as adhesive. Concave surface 25 is in gripping engagement with the side walls and the tread of the tire preventing relative motion between the tire and the sheet. Side 24 extends in the direction of the axis of rotation 14 whereas side 23 extends radially inward toward axis 14. Sheet 20 has a smooth outside surface 26 and a smooth inside surface 25' with a pair of edges 27 and 28. The two continuous edges 27 and 28 are positioned adjacent to brackets 21 and 22 with radially extending sides 23 being flush therewith.

As may be seen from FIG. 2, there are four brackets 21 mounted around axis 14 being spaced approximately 90° apart. Likewise, there are four brackets 22 which are mounted around the axis of rotation in a 90° relationship. In order to install the roller of FIG. 2 on the tire, it is desirable first to deflate the tire so that the roller and brackets may be slipped around the tire. The tire is then inflated to full pressure with the brackets 21 and 22 engaging the tread and side walls of the tire. The concave surfaces 25 of brackets 21 and 22 are spaced apart a distance less than the normal spacing between side walls 15 and 16. As a result, the concave sides depress slightly into the tire securely holding the sheet to the tire.

Figures 4, 5:
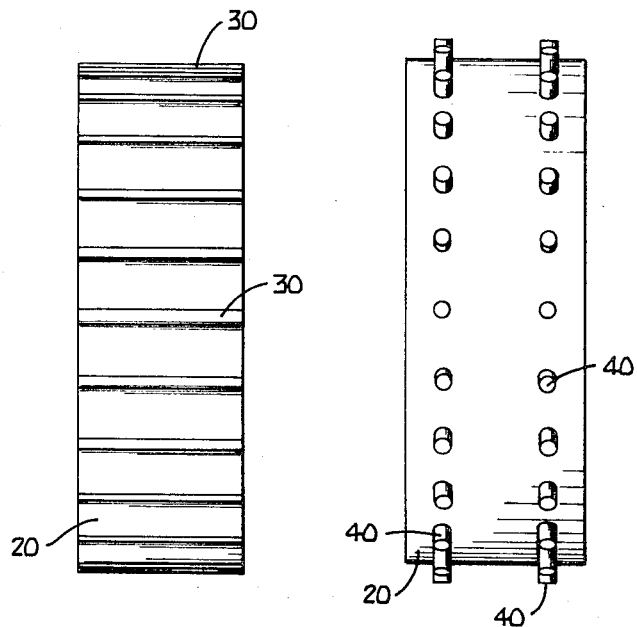
FIG. 4 is an end view looking in the direction of arrows 4—4 of FIG. 2 showing the roller with gripping straps attached thereto.
FIG. 5 is the same view as FIG. 4 only with the gripping straps being replaced with spikes protruding radially outward from the roller.

In many cases, the smooth exterior surface of sheet 20 may allow for slipping of the sheet with respect to the ground. As a result, a plurality of gripping straps 30 (FIG. 4) are mounted to the exterior surface of the roller sheet. The straps are secured to the roller sheet by standard fastening means such as screws. In one embodiment, the roller sheet was provided with ¼ inch holes which would receive ¼ inch screws depending from the straps. The extra grip provided by straps 30 was sufficient to prevent relative motion between the roller and the ground but yet did not protrude sufficiently from the roller sheet so as to provide permanent indentations in the ground. FIG. 5 shows a roller sheet identical to that previously shown and described only having a plurality of spikes 40 mounted to the exterior surface of the roller sheet and projecting radially therefrom. In many cases, it is desirable to loosen up the ground when rolling. Thus, spikes 40 are provided for this purpose. The spikes may be secured to the roller sheet by any number of means. For example, the spike end adjacent to the roller sheet may be threaded so as to be threadedly received by holes provided in the roller sheet. The spikes may be provided in rows or may be mounted to the roller sheet in random fashion.

Many variations in the roller are contemplated and included by this invention. For example, in lieu of having pairs of brackets 21 and 22, the brackets may be secured together in one integral piece. That is, a bracket 21 may be integrally joined to a bracket 22 by a web extending across the tread of the tire. The web may be positioned exteriorly of the roller sheet whereas the gripping portion of the brackets may project through the roller sheet so as to engage the tire. In addition, in lieu of having a concave gripping surface, it is possible to have a tapered surface to prevent relative motion between the sheet and the tire.

I have found that the tire belt roller disclosed herein is better than a pull-type roller because it is more stabilizing, easier to roll and more efficient. By having a tire belt roller on the rear wheels of a tractor, the weight of the tractor plus the operator is of sufficient amount to roll the field to the desired condition. In the instances where small humps are encountered, the tractor may be rolled forward or backward until the hump has disappeared. Of course, the tire belt roller can be made to fit any size tractor tire. It can be made of metal, hard rubber or hard plastic. I have found that hard rubber is preferable in producing the device. The tire roller belts may be mounted to both the front and rear tires of the tractor or may be provided only on the front or rear tires.

While the invention has been illustrated and described in detail in the drawing and foregoing description, the same is to be considered as illustrative and not restrictive it being understood that only the preferred embodiment has been shown and described and that all changes and modifications that come within the spirit of the invention are desired to be protected.

The invention claimed is:

1. In a roller for mounting on a tire which has an axis of rotation, said tire has a round side wall and a tread, said roller including a continuous sheet extending around said tire with an inner surface in contact with said tire, said sheet has an outer surface with projections thereon for increasing traction between ground and said sheet, wherein the improvement comprises:
a plurality of identical brackets fixedly mounted to said inner surface of said sheet securing said sheet to said tire, each of said brackets has a first flat side permanently attached to said inner surface of said sheet and a second flat side positioned at a right angle to said first side which extends toward said axis of rotation, each of said brackets has a third side opposite said right angle which is continuously smooth without flat portions forming a concave surface which complementarily receives said round side wall and a portion of said tread preventing relative radial motion between said tire and said sheet, said brackets are arranged on each side of said tire in direct opposing fashion preventing relative axial motion between said tire and said sheet, said brackets being connected together only by said sheet with each bracket on one side of said tire being separate from each bracket on an opposite side of said tire.

2. In the roller of claim 1 wherein the improvement further comprises:
said opposing brackets have their concave surfaces spaced apart a distance less than the normal spacing between side walls of said tire causing said brackets to depress said side wall at each location of contact between said tire and said bracket, said brackets are arranged around said axis of rotation every 90°.

3. The roller of claim 1 wherein:
said sheet has two continuous edges which are flush with said brackets mounted to said sheet adjacent to each of said two edges.

4. The roller of claim 3 in combination with a four wheel tractor having one of said sheets with said brackets mounted to each of said wheels.

5. The roller of claim 4 wherein said projections are spikes mounted to the outside surface of said sheet and projecting radially therefrom.

* * * * *